United States Patent
Kwak et al.

(10) Patent No.: US 7,738,014 B2
(45) Date of Patent: Jun. 15, 2010

(54) IMAGE SENSOR AND OPTICAL POINTING SYSTEM

(75) Inventors: Jong-Taek Kwak, Seongnam-si (KR); Duck-Young Jung, Yongin-si (KR)

(73) Assignee: Atlab Inc. (KR)

( * ) Notice: Subject to any disclaimer, the term of this patent is extended or adjusted under 35 U.S.C. 154(b) by 0 days.

(21) Appl. No.: 12/364,075

(22) Filed: Feb. 2, 2009

(65) Prior Publication Data

US 2009/0140981 A1    Jun. 4, 2009

Related U.S. Application Data

(63) Continuation-in-part of application No. 10/728,243, filed on Dec. 4, 2003, now abandoned.

(30) Foreign Application Priority Data

Dec. 5, 2002    (KR) .................. 10-2002-0077099
Jan. 31, 2008    (KR) .................. 10-2008-0010246

(51) Int. Cl.
*H04N 5/228*    (2006.01)
*H04N 5/235*    (2006.01)
*G06F 3/033*    (2006.01)
*G09G 5/08*    (2006.01)
*G09G 5/00*    (2006.01)

(52) U.S. Cl. ................ 348/222.1; 348/229.1; 345/163; 345/164; 345/165; 345/166; 345/156

(58) Field of Classification Search ............. 348/222.1, 348/229.1; 345/163–166, 156
See application file for complete search history.

(56) References Cited

U.S. PATENT DOCUMENTS

| | | | |
|---|---|---|---|
| 4,805,010 A | 2/1989 | Shroyer et al. | |
| 6,253,161 B1 | 6/2001 | Arias-Estrada | |
| 6,271,785 B1 | 8/2001 | Martin et al. | |
| 6,362,482 B1 | 3/2002 | Stettner et al. | |
| 6,365,950 B1 | 4/2002 | Sohn | |
| 6,590,610 B2 | 7/2003 | Castro et al. | |

(Continued)

FOREIGN PATENT DOCUMENTS

| | | |
|---|---|---|
| KR | 1020010061530 | 7/2001 |
| KR | 1020040049233 | 6/2004 |

*Primary Examiner*—Sinh Tran
*Assistant Examiner*—Christopher K Peterson
(74) *Attorney, Agent, or Firm*—Cantor Colburn LLP

(57) ABSTRACT

Provided is an image sensor and optical pointing system using the same. The image sensor has a plurality of pixels, each pixel including a photocell for receiving light and generating an analog signal having a voltage corresponding to a quantity of the received light, a comparator for, in response to a shutter control signal, comparing the analog signal of the photocell with an analog signal of an adjacent pixel to generate a digital signal for movement calculation, or comparing the analog signal of the photocell with a reference voltage to generate a digital signal for shutter control, and a switch for transferring the digital signal for movement calculation and the digital signal for shutter control in response to a pixel selection signal. The optical pointing system includes a reference voltage generation unit for generating a reference voltage, the image sensor, a signal selector for receiving the digital signal for movement calculation and the digital signal for shutter control, and selecting and outputting one of the digital signal for movement calculation and the digital signal for shutter control in response to a shutter control period selection signal, a movement calculation and shutter control unit for receiving the digital signal for movement calculation to obtain an image of an object and output a movement value of the optical pointing system and the shutter control period selection signal, and receiving the digital signal for shutter control to compare a high-level count value with a maximum count value and a minimum count value and output the shutter control signal.

12 Claims, 12 Drawing Sheets

U.S. PATENT DOCUMENTS

| | | | |
|---|---|---|---|
| 6,707,410 | B1 | 3/2004 | Bock |
| 6,750,437 | B2 | 6/2004 | Yamashita et al. |
| 6,806,458 | B2 | 10/2004 | Rotzoll et al. |
| 6,963,060 | B2 | 11/2005 | Knee et al. |
| 6,977,682 | B2 | 12/2005 | Mizuno et al. |
| 6,982,759 | B2 | 1/2006 | Goto |

IMAGE SENSOR AND OPTICAL POINTING SYSTEM

CROSS-REFERENCE TO RELATED APPLICATION

This application is a continuation-in-part of U.S. patent application Ser. No. 10/728,243, filed Dec. 14, 2003, which is related to and claims priority from Korean Patent Application No. 10-2002-0077099 filed on Dec. 5, 2002 and Korean Patent Application No. 10-2008-0010246 filed on Jan. 31, 2008, and all the benefits accruing therefrom under 35 U.S.C. §119, the disclosures of all of the above applications are herein incorporated by reference in their entirety.

BACKGROUND OF THE INVENTION

1. Field of the Invention

The present invention relates to an image sensor and, more particularly, to an image sensor for detecting light and an optical pointing system using the same.

2. Description of the Related Art

A conventional image sensor is configured with an N×N pixel array and obtains a two-dimensional image of a subject. Each pixel of the array generates an analog signal having a voltage corresponding to the brightness of a corresponding image area, and the image sensor outputs $N^2$ number of analog signals generated by each pixel.

FIG. 1 is a block diagram showing the internal structure of a conventional optical pointing system with an image sensor. The optical pointing system includes an image sensor 1, an analog/digital (A/D) converter 2, a pre-filter 3, an image processor 4 and a shutter control circuit 5.

The image sensor 1 obtains a two-dimensional image of a subject and generates and outputs $N^2$ number of output signals having analog voltage values corresponding to the brightness of each area of the obtained image.

The A/D converter 2 converts each of the signals output from the image sensor 1 into a digital signal having an n-bit structure, i.e., into an "n-bit digital signal", and the pre-filter 3 converts each of the converted n-bit digital signals output from the A/D converter 2 into a digital signal having a 1-bit structure, i.e., into a "1-bit digital signal".

The image processor 4 detects an image of the subject using the 1-bit digital signals converted by the pre-filter 3, compares the detected current image of the subject and the detected previous image of the subject, calculates a movement value V(K), and outputs the calculated movement value V(K).

In response to the n-bit digital signals output from the A/D converter 2, the shutter control circuit 5 generates a shutter control signal CSH and provides it to the image sensor 1.

The shutter control signal CSH controls an exposure time of the image sensor 1 so that light incident on the image sensor 1 maintains a given average value at all times, thus allowing the image sensor 1 to obtain an exact image of the subject.

In this way, the conventional optical pointing system minimizes the number of bits of data needed to calculate the movement value and provides the result to the image processor, so that it may have a fast response characteristic.

However, the conventional optical pointing system must include the A/D converter and the pre-filter in order to provide the minimized 1-bit digital signal to the image processor. Thus, its layout increases in proportion to the areas of the A/D converter and the pre-filter. In other words, when the conventional optical pointing system is implemented as a semiconductor integrated circuit, the A/D converter and the pre-filter increase chip size.

SUMMARY OF THE INVENTION

It is a first object of the present invention to provide an image sensor capable of performing a signal processing function and outputting digital signals without an analog/digital (A/D) converter and a pre-filter.

It is a second object of the present invention to provide an optical pointing system capable of decreasing a layout area by using the image sensor and varying a shutter-on time by comparing an output signal of a pixel with an output signal of an adjacent pixel in the image sensor, a variety of reference voltages, or signals for shutter control.

In order to accomplish the first object, a first aspect of the present invention provides an image sensor having a plurality of pixels, each pixel comprising: a photocell for receiving light and generating an analog signal corresponding to a quantity of the received light; a comparator for comparing the analog signal of the photocell with an analog signal of a photocell of an adjacent pixel and generating a digital signal having a value of the comparison result; and a switch for outputting the digital signal of the comparator. Here, the digital signal has a 1-bit structure.

The analog signal of the photocell of the adjacent pixel may be a reference voltage.

The photocell may have a photodiode generating a photocurrent corresponding to the quantity of the received light.

The comparator may be a latch type comparator which outputs a first signal when the analog signal of the photocell is greater than the analog signal of the photocell of the adjacent pixel, and outputs a second signal when the analog signal of the photocell is less than the analog signal of the photocell of the adjacent pixel.

In order to accomplish the second object, a first aspect of the present invention provides an optical pointing system comprising: a plurality of pixels each having a photocell for receiving light and generating an analog signal corresponding to a quantity of the received light, a comparator for comparing the analog signal of the photocell with a reference signal and generating a digital signal having a value of the comparison result, and a switch for outputting the digital signal of the comparator under the control of a pixel selection signal; an image processor for calculating a movement value using the digital signals output from the pixels and generating the pixel selection signal and a shutter control information signal; and a shutter control circuit for generating a shutter control signal corresponding to the shutter control information signal of the image processor. Here, the digital signal has a 1-bit structure.

In order to accomplish the first object, a second aspect of the present invention provides an image sensor having a plurality of pixels, each pixel comprising: a photocell for receiving light and generating an analog signal having a voltage corresponding to a quantity of the received light; a comparator for, in response to a shutter control signal, comparing the analog signal of the photocell with an analog signal of an adjacent pixel to generate a digital signal for movement calculation, or comparing the analog signal of the photocell with a reference voltage to generate a digital signal for shutter control; and a switch for transferring the digital signal for movement calculation and the digital signal for shutter control in response to a pixel selection signal.

The photocell may have a photodiode generating a photocurrent corresponding to the quantity of the received light.

The comparator may be a latch type comparator which outputs a first signal when the analog signal of the photocell is greater than the analog signal of the adjacent pixel or the reference signal, and outputs a second signal when the analog signal of the photocell is less than the analog signal of the adjacent pixel or the reference signal.

The first signal of the image sensor may be the digital signal for movement calculation and the digital signal for shutter control having a high voltage, and the second signal may be the digital signal for movement calculation and the digital signal for shutter control having a low voltage.

In order to accomplish the second object, a second aspect of the present invention provides an optical pointing system comprising: a reference voltage generation unit for generating a reference voltage; an image sensor having a plurality of pixels, receiving light, generating a plurality of analog signals corresponding to a quantity of the received light, and, in response to a shutter control signal, comparing analog signals of adjacent pixels to generate a digital signal for movement calculation or comparing the analog signals with the reference voltage to generate a digital signal for shutter control; a signal selector for receiving the digital signal for movement calculation and the digital signal for shutter control, and selecting and outputting one of the digital signal for movement calculation and the digital signal for shutter control in response to a shutter control period selection signal; a movement calculation and shutter control unit for receiving the digital signal for movement calculation to obtain an image of an object and output a movement value of the optical pointing system and the shutter control period selection signal, and receiving the digital signal for shutter control to compare a high-level count value with a maximum count value and a minimum count value and output the shutter control signal.

The movement calculation and shutter control unit may include: an image processor for generating a reset signal and a pixel selection signal, and receiving the digital signal for movement calculation to obtain the image of the object and output the movement value of the optical pointing system and the shutter control period selection signal; and a shutter control circuit for receiving the digital signal for shutter control to set the high-level maximum count value and minimum count value in advance, and comparing the number of high-level digital signals for shutter control with the maximum count value and the minimum count value to output the shutter control signal.

The image sensor may include: a photocell for receiving the light and generating an analog signal having a voltage corresponding to the quantity of the received light; a comparator for, in response to the shutter control signal, comparing the analog signals of adjacent pixels to generate the digital signal for movement calculation, or comparing the analog signals of the pixels with the reference voltage to generate the digital signal for shutter control; and a switch for receiving the digital signal for movement calculation and the digital signal for shutter control and switching to transfer the digital signal for movement calculation and the digital signal for shutter control in response to the pixel selection signal.

The image processor may generate and output the reset signal initializing the pixels, the pixel selection signal selecting at least one of the pixels, and the shutter control period selection signal selecting a shutter control frame time period for comparing an output signal of the selected pixel with the reference voltage to the image sensor, receive the digital signal for movement calculation to obtain the image of the object using the digital signal, and compare the image of the object with a previously obtained image of the object to calculate and output the movement value of the optical pointing system.

The shutter control circuit may output the shutter control signal reducing a shutter-on time when the number of high-level digital signals for shutter control is the maximum count value or more, compare the number of high-level digital signals for shutter control with the minimum count value when the number of high-level digital signals for shutter control is less than the maximum count value, output the shutter control signal increasing the shutter-on time when the number of high-level digital signals for shutter control is the minimum count value or less, and output the shutter control signal maintaining the shutter-on time when the number of high-level digital signals for shutter control is greater than the minimum count value.

The shutter control circuit may set the maximum count value and the minimum count value of the high-level digital signals for shutter control in advance, and compare the number of high-level digital signals for shutter control with the maximum count value and the minimum count value to output a reference voltage selection signal.

The reference voltage generation unit may include: a reference voltage generator for receiving a power supply voltage from outside and generating a plurality of reference voltages; and a multiplexer for receiving and selecting one of the reference voltages in response to the reference voltage selection signal.

The shutter control circuit may output the reference voltage selection signal selecting a low reference voltage from among the reference voltages when the number of high-level digital signals for shutter control is the maximum count value or more, compare the number of high-level digital signals for shutter control with the minimum count value when the number of high-level digital signals for shutter control is less than the maximum count value, output the reference voltage selection signal selecting a high reference voltage from among the reference voltages when the number of high-level digital signals is the minimum count value or less, and output the reference voltage selection signal maintaining the reference voltage when the number of high-level digital signals is greater than the minimum count value.

In order to accomplish the second object, a third aspect of the present invention provides an optical pointing system comprising: an image sensor for receiving light in response to a reset signal and a pixel selection signal, and generating and outputting a plurality of analog signals corresponding to a quantity of the received light; a comparator for receiving the analog signals to compare voltages in response to a shutter control signal and generate a first comparison digital signal, and receiving one of the analog signals and a maximum reference voltage or a minimum reference voltage to compare voltages and generate and output second and third comparison digital signals; and a movement calculation and shutter control unit for receiving the first comparison digital signal to calculate a movement value of the optical pointing system, and receiving the second and third comparison digital signals to compare a high-level count value with a maximum count value and a minimum count value of high-level first comparison digital signals and output the shutter control signal.

The comparator may include: a first comparator for receiving the analog signals to compare the voltages in response to the shutter control signal and generate and output the first comparison digital signal; and a second comparator for receiving the one of the analog signals and the maximum reference voltage or the minimum reference voltage to compare the voltages and generate and output the second and third comparison digital signals.

The movement calculation and shutter control unit may include: an image processor for generating the reset signal and the pixel selection signal, and receiving the first comparison digital signal to obtain an image of an object and calculate and output the movement value of the optical pointing system; and a shutter control circuit for setting the maximum count value and the minimum count value of the high-level first comparison digital signals in advance, and comparing a number of high-level second comparison digital signals and a number of high-level third comparison digital signals with the maximum count value and the minimum count value to output the shutter control signal.

The optical pointing system may further comprise: a reference voltage generation unit for receiving a power supply voltage from outside and generating the maximum reference voltage and the minimum reference voltage; a row selector for outputting a plurality of row selection signals selecting pixels in a vertical direction by designating a row address of pixels in the image sensor; and a column selector for designating pixels in a horizontal direction in response to the pixel selection signal, and selecting one pixel at a crossing point along a row address designated by one of the row selection signals to receive and transfer an analog signal.

The column selector may include: a plurality of switches for switching in response to the pixel selection signal, receiving the analog signal of the selected pixel from the image sensor, and transferring the analog signal.

The image sensor may include: a photocell for performing an initialization operation in response to the reset signal, and obtaining the image of the object when one or more pixels are selected in response to the pixel selection signal to generate an analog signal having a voltage proportional to the quantity of the received light.

The first comparator may receive voltage signals of the selected pixels, compare voltages in response to the shutter control signal, generate and output the first comparison digital signal having a high level when one of the selected pixels has a higher output signal voltage than another one of the selected pixels, and generate and output the first comparison digital signal having a low level when one of the selected pixels has a lower output signal voltage than another one of the selected pixels.

The image processor may generate and output the reset signal initializing the pixels and the pixel selection signal selecting the one or more pixels, receive the first comparison digital signal to obtain the image of the object using the first comparison digital signal, and compare the image of the object with a previously obtained image of the object to calculate and output the movement value of the optical pointing system.

The second comparator may receive one of the voltage signals of the selected pixels and the maximum reference voltage, compare voltages, generate and output the second comparison digital signal having a high level when a voltage of the voltage signal is higher than the maximum reference voltage, and generate and output the second comparison digital signal having a low level when the voltage of the voltage signal is lower than the maximum reference voltage.

The second comparator may receive one of the voltage signals of the selected pixels and the minimum reference voltage, compare voltages, generate and output the third comparison digital signal having a high level when a voltage of the voltage signal is higher than the minimum reference voltage, and generate and output the third comparison digital signal having a low level when the voltage of the voltage signal is lower than the minimum reference voltage.

The shutter control circuit may output the shutter control signal reducing a shutter-on time when the number of high-level second comparison digital signals is the maximum count value or more, compare the number of high-level third comparison digital signals with the minimum count value when the number of high-level second comparison digital signals is less than the maximum count value, output the shutter control signal increasing the shutter-on time when the number of high-level third comparison digital signals is the minimum count value or less, and output the shutter control signal maintaining the shutter-on time when the number of high-level third comparison digital signals is greater than the minimum count value.

The optical pointing system may further comprise: a plurality of pixels for shutter control for performing the initialization operation in response to the reset signal, and generating and outputting a plurality of analog signals for shutter control having voltages proportional to the quantity of the received light when the one or more pixels are selected in response to the pixel selection signal; and a signal selector for shutter control for receiving the analog signals for shutter control, and selecting and outputting at least one of the analog signals for shutter control in response to an analog signal selection signal for shutter control from the shutter control circuit.

The second comparator may receive one of the analog signals and at least one of the analog signals for shutter control, compare voltages, and generate and output a fourth comparison digital signal.

The second comparator may generate and output the fourth comparison digital signal having a high level when one of the voltage signals of the selected pixels has a higher voltage than the analog signal for shutter control, and the fourth comparison digital signal having a low level when one of the voltage signals of the selected pixels has a lower voltage than the analog signal for shutter control.

The shutter control circuit may output the shutter control signal reducing the shutter-on time when a number of high-level fourth comparison digital signals is the maximum count value or more, compare the number of high-level fourth comparison digital signals with the minimum count value when the number of high-level fourth comparison digital signals is less than the maximum count value, output the shutter control signal increasing the shutter-on time when the number of high-level fourth comparison digital signals is the minimum count value or less, output the shutter control signal maintaining the shutter-on time when the number of high-level fourth comparison digital signals is greater than the minimum count value, and receive the analog signals for shutter control to output the analog signal selection signal for shutter control selecting the at least one of the analog signals for shutter control.

The pixels for shutter control may be located at a part of the exterior of the pixels, surrounding the exterior of the pixels, or at a part of the interior of the pixels.

The optical pointing system may further comprise: a pickup state detector connected with the signal selector for shutter control in parallel, receiving the analog signals for shutter control, comparing outputs, determining whether or not the optical pointing system is picked up, and outputting a hold request signal; and a surface state detector connected with the signal selector for shutter control in parallel, receiving the analog signals for shutter control, comparing the outputs, and outputting a surface information signal indicating a surface state of a worktable to an external host computer.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 2:
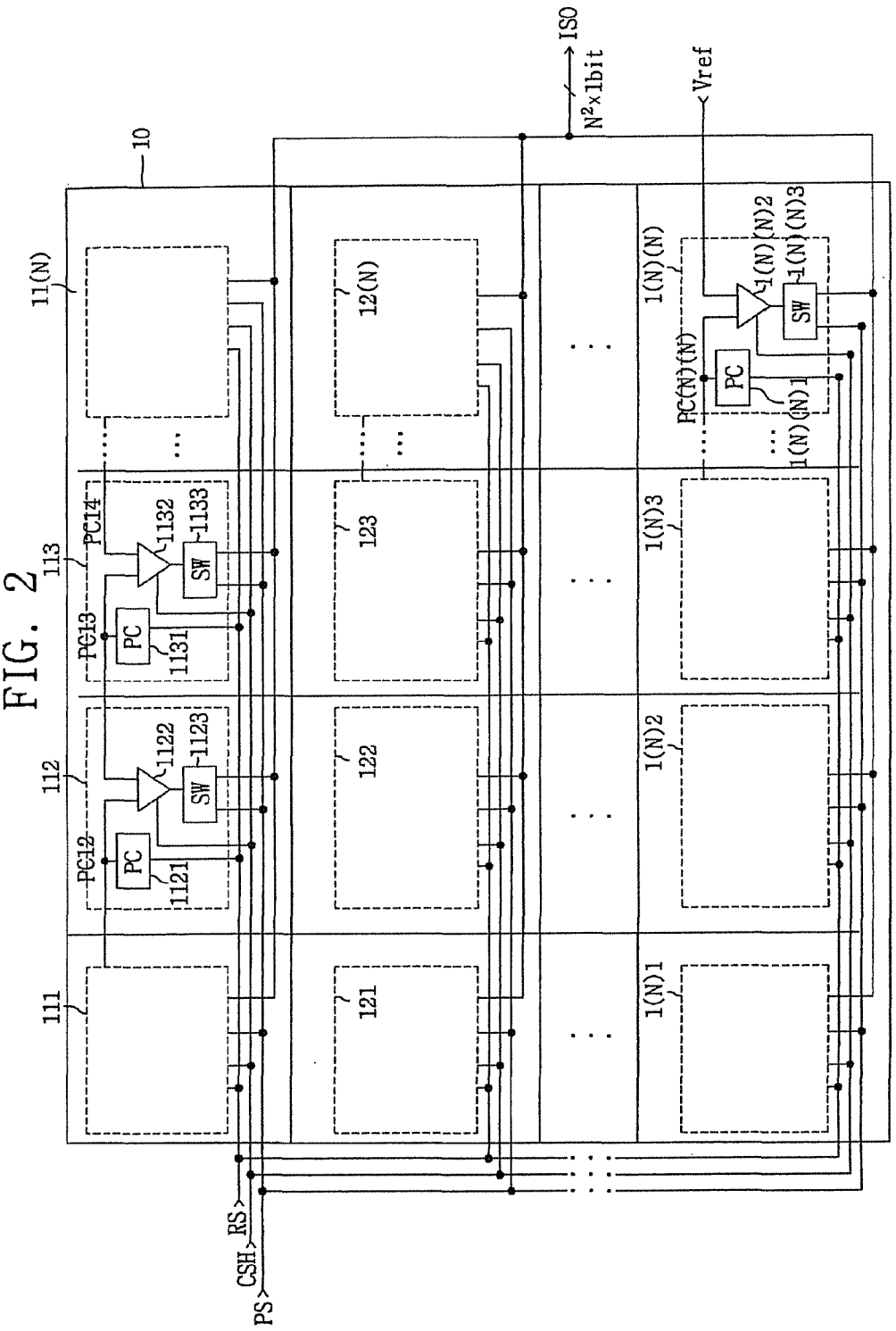
FIG. 2 is a diagram of the configuration of an image sensor according to a first exemplary embodiment of the present invention.

FIG. 2 is a diagram of the configuration of an image sensor according to a first exemplary embodiment of the present invention.

Referring to FIG. 2, the image sensor 10 of the present invention includes a plurality of pixels 111 to 1NN constituting an N×N pixel array (where, N is the positive integer). Each pixel, for example, the pixel 112, has a photocell 1121, a comparator 1122 and a switch 1123.

The pixels 111 to 1NN produce a two-dimensional image of a subject under the control of a reset signal RS and a shutter control signal CSH, and each pixel generates a 1-bit digital signal ISO having a value corresponding to the brightness of an image area thereof.

The image sensor 10 outputs $N^2$ number of 1-bit digital signals ISO, which are generated through the pixels 111 to 1NN, to the outside under the control of a pixel selection signal PS.

Description of each pixel of the image sensor 10, for example the pixel 112, will be made in more detail below.

The photocell 1121 of the pixel 113 performs an initialization operation in response to the reset signal RS. When completing the initialization operation, the photocell 1121 generates an analog signal PC12 having a voltage proportional to a quantity of incident light.

The generated analog signal PC12 is provided to the comparator 1122 of the corresponding pixel 112 and a comparator 1132 of an adjacent pixel 113.

The comparator 1122 compares an output signal PC12 of the photocell 1121 located within the corresponding pixel 112 with an output signal PC13 of a photocell 1131 located within the adjacent pixel 113 under the control of the shutter control signal CSH.

As a result of the comparison operation by the comparator 1122, when a voltage of the output signal PC12 of the photocell 1121 located within the corresponding pixel 112 is higher than that of the output signal PC13 of the photocell 1131 located within the adjacent pixel 113, a 1-bit digital signal having the high level is generated. However, when the voltage of the output signal PC12 of the photocell 1121 is lower than that of the output signal PC13 of the photocell 1131, a 1-bit digital signal COMO12 having the low level is generated.

At this time, for a comparator 1N3 contained in a pixel 1NN having no adjacent pixel, either a reference voltage Vref generated by a reference voltage generation circuit (not shown) or an output signal of another adjacent pixel may be used.

Here, the comparator 1122 is a latch type comparator, which operates like a memory under the control the shutter control signal CSH and maintains the 1-bit digital signal generated by the comparison.

In this respect, the comparator 1122 performs a shutter function, so that the image sensor of the present invention does not require a separate shutter structure.

The switch 1123 receives the output signal COMO12 of the comparator 1122 and outputs the received output signal COMO12 to the outside under the control of the pixel selection signal PS.

Figure 3:
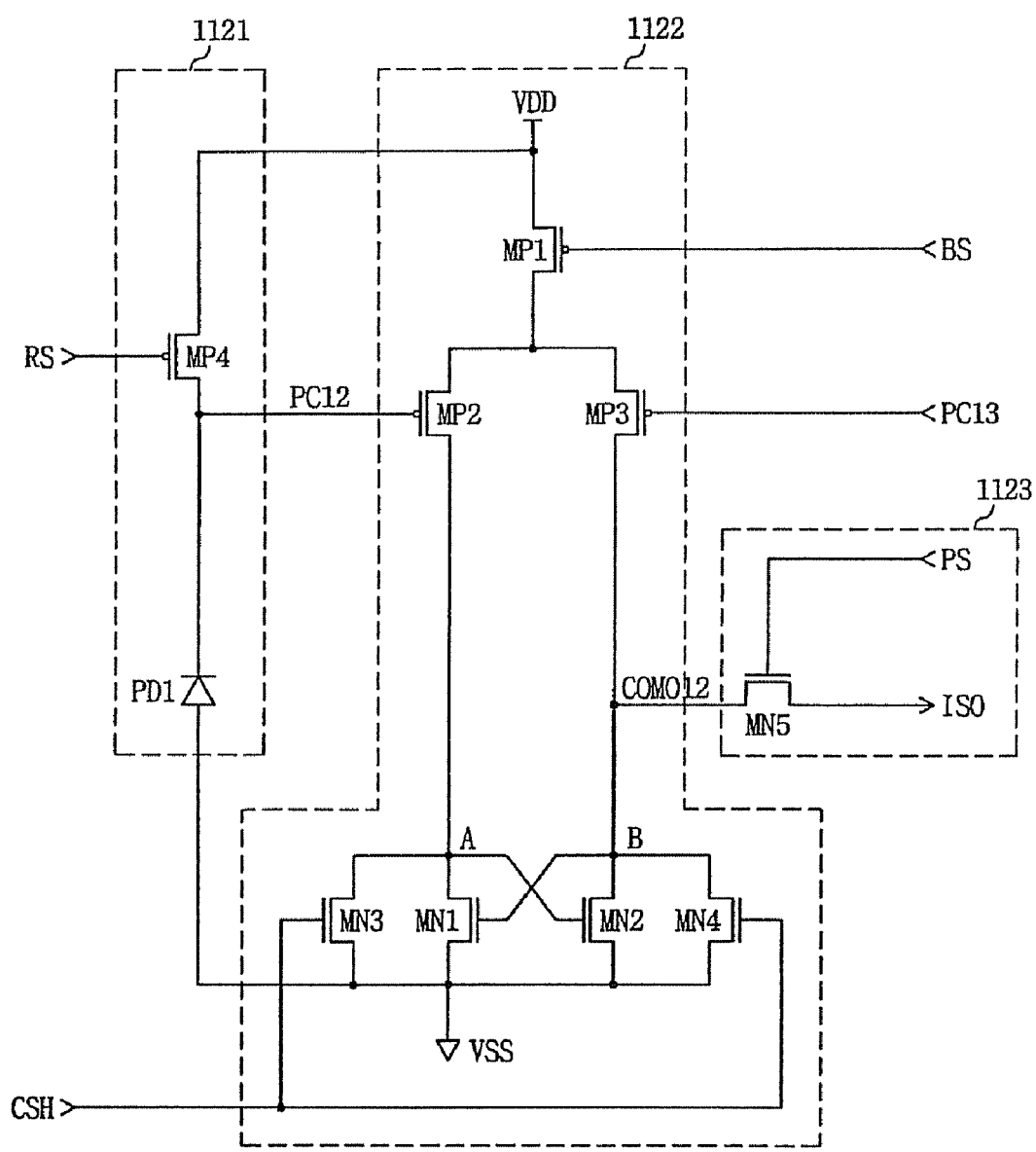
FIG. 3 is a detailed circuit diagram of a unit pixel of FIG. 2.

FIG. 3 is a detailed circuit diagram of the unit pixel 112 of FIG. 2.

Referring to FIG. 3, the unit pixel 112 of the present invention includes the photocell 1121, the comparator 1122 and the switch 1123. The photocell 1121 includes a first photodiode PD1 and a fourth p-channel metal oxide semiconductor (PMOS) transistor MP4. The first photodiode PD1 receives light with an anode connected to a ground VSS and generates a photocurrent $I_{PH}$ proportional to a quantity of the received light, and the fourth PMOS transistor MP4 has a source terminal connected to a power supply voltage VDD, a gate terminal to which a reset signal RS is applied, and a drain terminal connected to a cathode of the first photodiode PD1. Here, the first photodiode PD1 of the photocell 1121 has a parasitic capacitor (not shown) in itself according to characteristics of a general photodiode circuit.

The comparator 1122 includes a first PMOS transistor MP1 having a source terminal connected to the power supply voltage VDD and a gate terminal to which a bias control signal BS is applied, a second PMOS transistor MP2 having a source terminal connected to the first PMOS transistor MP1 and a gate terminal to which an analog signal PC10 of the photocell 1121 is applied, a third PMOS transistor MP3 having a source terminal connected to the first PMOS transistor MP1 and a gate terminal to which an analog signal PC13 of the adjacent photocell 1131 (not shown) is applied, a first NMOS (N-channel metal oxide semiconductor) transistor MN1 having a drain terminal connected to a drain terminal of the second PMOS transistor MP2 and a source terminal connected to the ground VSS, a second NMOS transistor MN2 having a drain terminal connected to a drain terminal of the third PMOS transistor MP3 and a source terminal connected to the ground VSS, a third NMOS transistor MN3 having a drain terminal connected to a drain terminal of the second PMOS transistor MP2, a gate terminal to which the shutter control signal CSH is applied and a source terminal connected to the ground VSS, and a fourth NMOS transistor MN4 having a drain terminal connected to a drain terminal of the third PMOS transistor MP3, a gate terminal to which the shutter control signal CSH is applied and a source terminal connected to the ground VSS.

The switch 1123 includes a fifth NMOS transistor MN5 having a gate terminal receiving the pixel selection signal PS, a drain terminal to which the digital signal COMO12 of the comparator 1122 is applied and a source terminal to which a digital signal ISO of the image sensor is outputted.

Operation of the unit pixel 112 configured as above will be described below.

An initial voltage of the first photodiode PD1 initialized by the reset signal RS having the low level is set only in case of need either at initialization time immediately after application of power or during an operation. And, at initialization time during the operation, the shutter control signal CSH having the high level and a bias signal BS having a proper level are applied. The bias signal BS stably operates in the circuit when it does not perform an on/off operation, but it may perform the on/off operation at initialization time in order to reduce the current consumption. At initialization time during the operation, the first PMOS transistor MP1 turns off in response to the bias signal BS having the high level, and the third and fourth NMOS transistors MN3 and MN4 turn on in response to the shutter control signal CSH having the high level. Thus, nodes A and B have the ground voltage. Consequently, at initialization time during the operation, the operation of the comparator 1122 is disabled, and the output signal COMO12 of the ground voltage is generated.

In this state, when the bias voltage BS having a proper level is applied and the shutter control signal CSH is switched to the low level, the fourth PMOS transistor MP4 and the third and fourth NMOS transistors MN3 and MN4 turn off and the first PMOS transistor MP1 turns on, and thus the operation of the comparator 1122 is enabled. As a result, the unit pixel 112 can detect the quantity of light.

When the first photodiode PD1 of the unit pixel 112 receives more quantity of light than that of an adjacent photodiode (not shown) of the adjacent unit pixel 113, a current flowing through the first photodiode PD1 is more than that flowing through the adjacent photodiode (not shown).

Thus, the output signal PC12 has a lower voltage than the output signal PC13.

Then, the current flowing through the second PMOS transistor MP2 becomes more than that flowing through the third PMOS transistor MP3, and thus the voltage of the node A becomes higher than that of the node B.

In addition, when the voltage of the node A becomes high enough to turn on the second NMOS transistor MN2, the voltage of the node B becomes the ground voltage. In other words, the output signal COMO12 becomes the low level.

At this time, when the pixel selection signal PS having the high level is applied to the switch 1123, the fifth NMOS transistor MN5 turns on, and the output signal COMO12 having the low level is transferred as the signal ISO.

On the other hand, when the first photodiode PD1 of the unit pixel 112 receives less quantity of light than that of the adjacent photodiode (not shown) of the adjacent unit pixel 113, the current flowing through the first photodiode PD1 is less than that flowing through the adjacent photodiode (not shown).

Therefore, the output signal PC12 has a higher voltage than the output signal PC13. Then, the current flowing through the third PMOS transistor MP3 becomes more than that flowing through the second PMOS transistor MP2, and thus the voltage of the node B becomes higher than that of the node A.

In addition, when the voltage of the node B becomes high enough to turn on the first NMOS transistor MN1, the voltage of the node A becomes the ground voltage and the voltage of the node B becomes higher. In other words, the output signal COMO12 becomes the high level.

At this time, when the pixel selection signal PS having the high level is applied to the switch 1123, the fifth NMOS transistor MN5 turns on, and the output signal COMO12 having the high level is transferred as the signal ISO.

As such, the unit pixel of the present invention includes the comparator 1122 operating in a latch type, thereby providing the same effects as an analog/digital (A/D) converter having a considerable level of resolution.

In addition, since the comparator 1122 maintains the 1-bit digital signal COMO12 generated by a comparison operation until the next shutter control signal CSH is applied, the comparator 1122 does not require a separate shutter structure.

Figure 4:
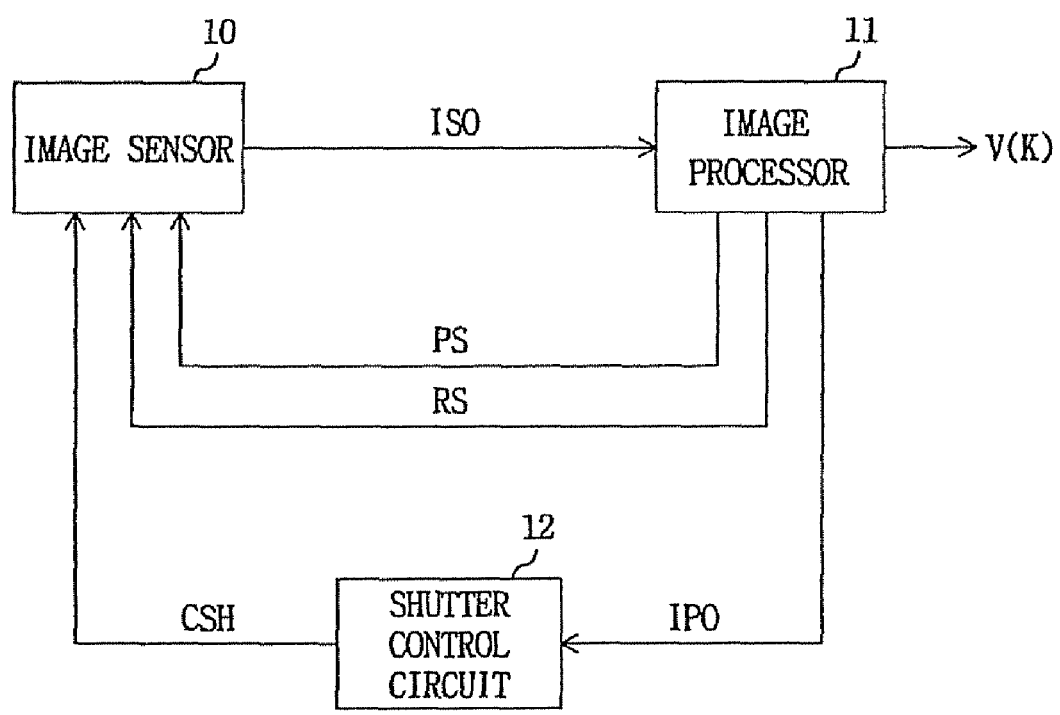
FIG. 4 is a block diagram of the internal structure of an optical pointing system with the image sensor of FIG. 2.

FIG. 4 is a block diagram of the internal structure of an optical pointing system with the image sensor of FIG. 2.

Referring to FIG. 4, the optical pointing system of the present invention further includes an image processor 11 and a shutter control circuit 12, in addition to the image sensor 10 of FIG. 2.

Figure 1:
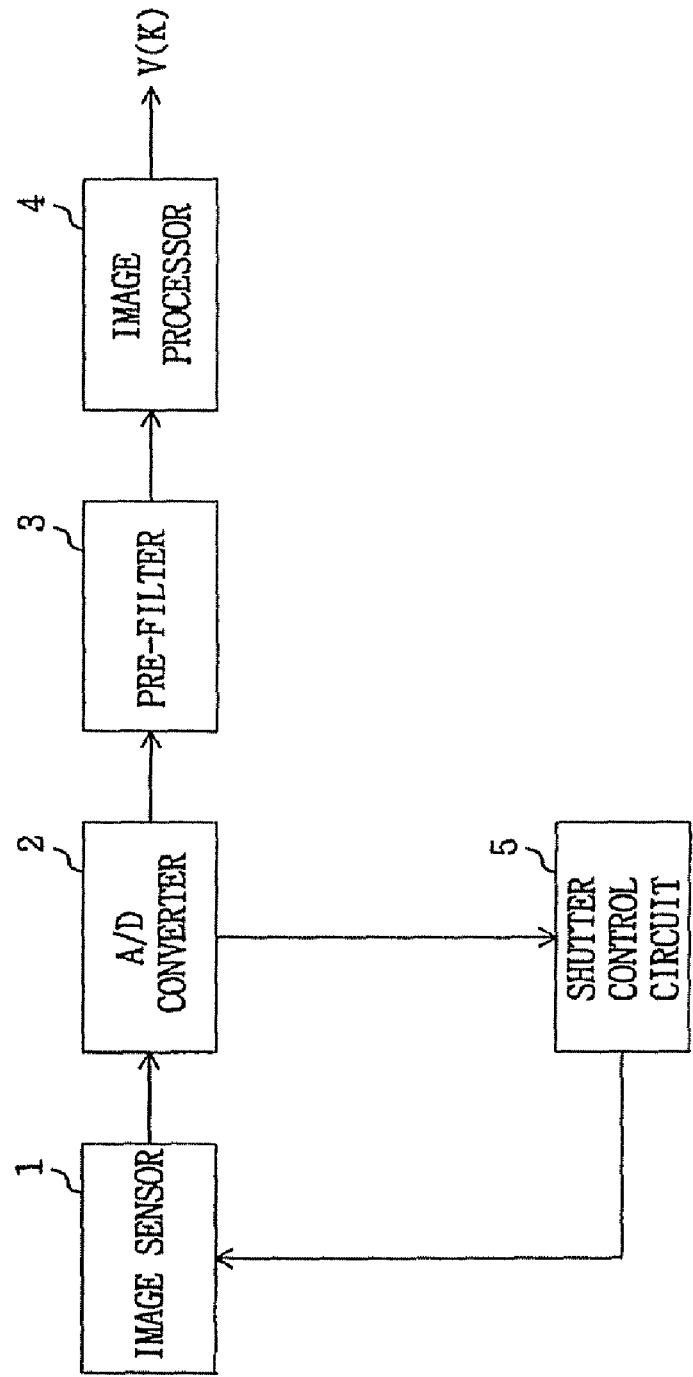
FIG. 1 is a block diagram of the internal structure of a conventional optical pointing system with an image sensor.

The image sensor 10 of FIG. 4 has the same structure and operation as that of FIG. 1, and thus its detailed description will be omitted.

The image sensor 10 generates $N^2$ number of 1-bit digital signals ISO having values corresponding to the brightness of each image area and outputs the generated 1-bit digital signals to the outside.

The image processor 11 obtains an image of a subject using the $N^2$ number of 1-bit digital signals ISO received from the image sensor 10, compares the obtained present image of the subject with the previous image of the subject to calculate a movement value V(K), and then outputs the calculated movement value V(K).

In addition, the image processor 11 generates the reset signal RS for initializing each pixel of the image sensor 10 and the pixel selection signal PS for receiving the $N^2$ number of 1-bit digital signals ISO from the image sensor 10 and then provides them to the image sensor 10. In addition, the image processor 11 generates a shutter information provision signal IPO (a signal for providing shutter information) for controlling an exposure time of a shutter of the image sensor 10 and then provides it to the shutter control circuit 12. When the shutter control circuit 12 performs an active function for calculating a complicated shutter on period, the shutter information provision signal IPO may be a simple start signal of indicating a time to operate. However, when the shutter control circuit 12 performs a simple passive function, the shutter information provision signal IPO must be a signal including information on a period in which the shutter must be turned on.

The shutter control circuit 12 generates the shutter control signal CSH in response to the shutter information provision signal IPO given from the image processor 11, and provides it to the image sensor 10.

Figure 5:
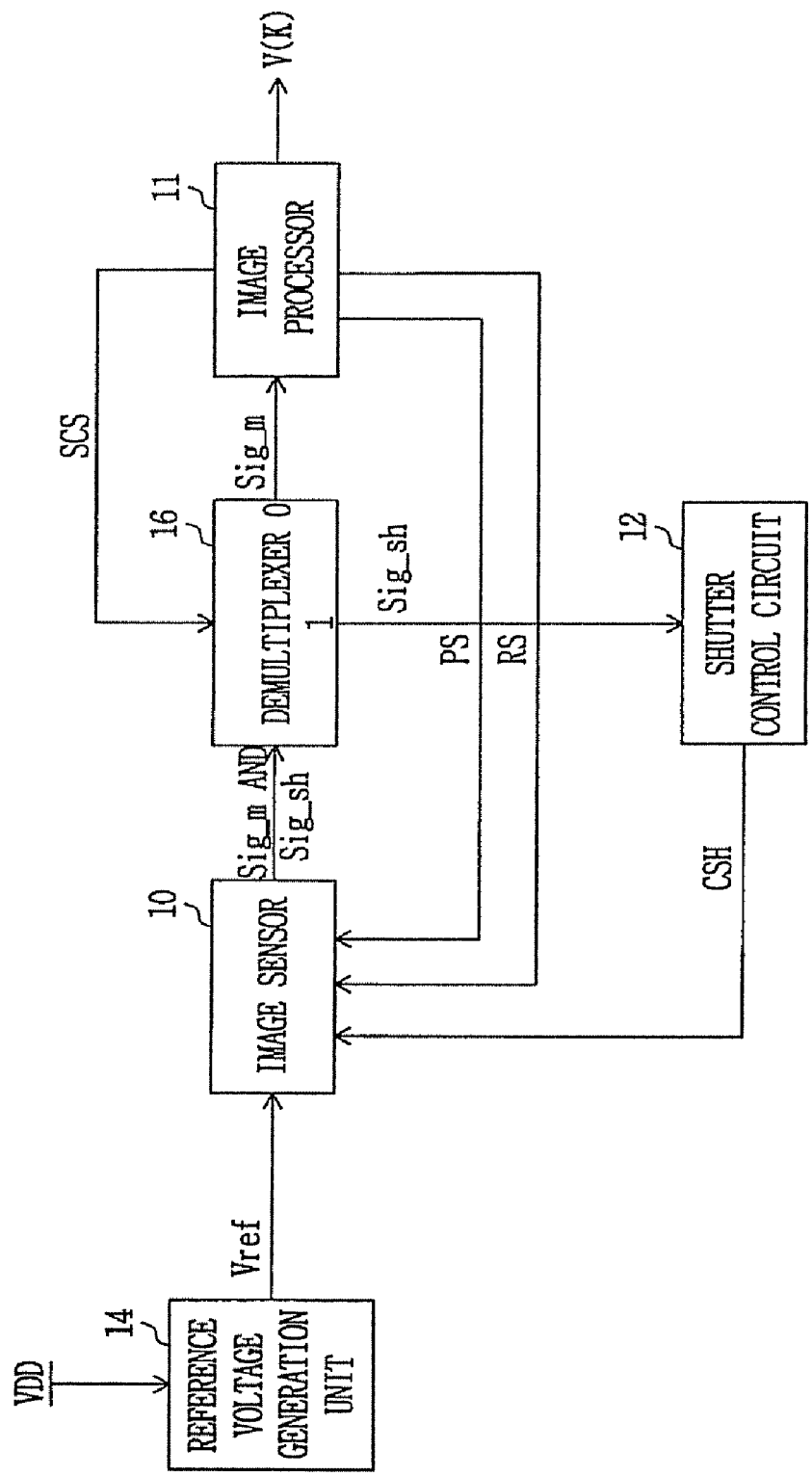
FIG. 5 is a block diagram of an overall optical pointing system with an image sensor according to a second exemplary embodiment of the present invention.

FIG. 5 is a block diagram of an overall optical pointing system with an image sensor according to a second exemplary embodiment of the present invention. The optical pointing system includes a reference voltage generation unit 14, an image sensor 10, a demultiplexer 16, an image processor 11 and a shutter control circuit 12.

The optical pointing system is different from the optical pointing system according to the first exemplary embodiment of the present invention shown in FIG. 4 in that it additionally has the reference voltage generation unit 14 and the demultiplexer 16.

Here, the image processor 11 and the shutter control circuit 12 may be combined as a movement calculation and shutter control unit, or all the blocks may be integrated in one semiconductor chip.

Figure 6:
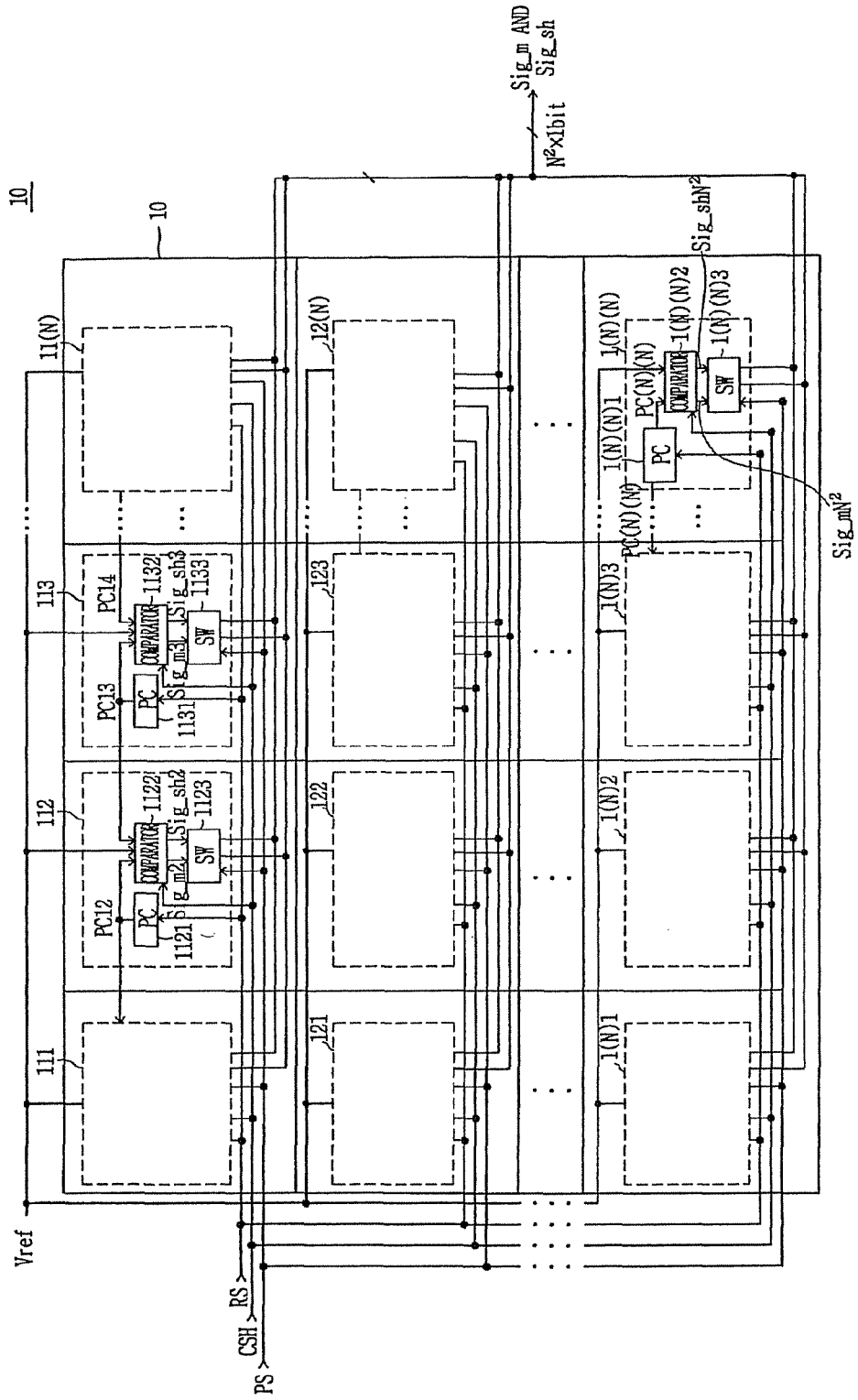
FIG. 6 is a diagram of the configuration of an image sensor in an optical pointing system according to the second exemplary embodiment of the present invention.

FIG. 6 is a diagram of the configuration of the image sensor 10 in the optical pointing system according to the second exemplary embodiment of the present invention. The image sensor includes a plurality of pixels 111 to 1NN constituting an N×N pixel array, and each pixel, for example, the pixel 112 has a photocell 1121, a comparator 1122 and a switch 1123.

Figure 7:
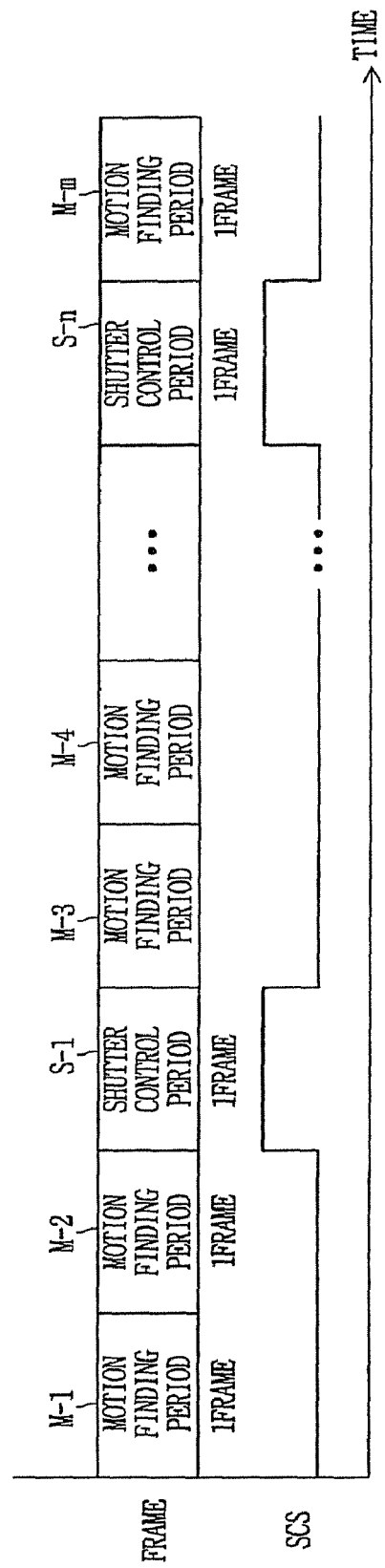
FIG. 7 illustrates a relationship between frames classified according to operation time and a shutter control period selection signal in an optical pointing system according to the second exemplary embodiment of the present invention.

FIG. 7 illustrates a relationship between frames classified according to operation time and a shutter control period selection signal in the optical pointing system according to the second exemplary embodiment of the present invention. A plurality of calculation frames M-1 to M-m and a plurality of shutter control frames S-1 to S-n are multiplexed while sharing time.

In FIG. 7, for example, 3400 frames may correspond to one second. In this case, during each movement calculation frame, image data is applied from the N×N pixels, and an output signal PC12 of the photocell 1121 located in the corresponding pixel 112 is compared with an output signal PC13 of the photocell 1121 located in the adjacent pixel 113. During each shutter control frame, image data is applied from the N×N pixels, and the output signal PC12 of the photocell 1121 located in the corresponding pixel 112 is compared with a reference voltage.

A shutter control signal CHS becomes the high level in a time period in which the shutter control frames S-1 to S-n are selected when the movement calculation frames M-1 to M-m and the shutter control frames S-1 to S-n numbering 3400 share one second, that is, are multiplexed. There can be a plurality of the shutter control signals CHS having the high level.

Referring to FIGS. 5 to 7, functions of the blocks of the optical pointing system according to the second exemplary embodiment of the present invention will be described below.

The reference voltage generation unit 14 receives a power supply voltage VDD from the outside and generates a reference voltage Vref to be compared with voltage signals output from the respective pixels 111 to 1NN.

After performing an initialization operation in response to the reset signal RS of the image processor 11, the image sensor 10 obtains a two-dimensional image of an object to generate an analog signal having a voltage proportional to a quantity of incident light, and provides the analog signal to the comparator 1122 of the corresponding pixel 112 and a comparator 1132 of the adjacent pixel 113 to compare the analog signal with the output signal PC13 of the photocell 1121 located in the adjacent pixel 113 or the reference voltage Vref in response to the shutter control signal CHS and output a 1-bit digital signal sig_m for movement calculation or a 1-bit digital signal sig_sh for shutter control.

The demultiplexer 16 receives the 1-bit digital signal sig_m for movement calculation and the 1-bit digital signal sig_sh for shutter control and selects and outputs one of the two 1-bit digital signals sig_m and sig_sh in response to the shutter control period selection signal SCS.

The image processor 11 outputs the reset signal RS, which initializes the image sensor 10, a pixel selection signal PS, which selects one of the pixels 111 to 1NN, and the shutter control period selection signal SCS, which selects a shutter control frame time period in which image data is applied from the pixels 111 to 1NN and the output signal PC12 of the photocell 1121 located in the corresponding pixel 112 is compared with the reference voltage Vref. And, the image processor 11 receives the 1-bit digital signal sig_m for movement calculation from the demultiplexer 16, obtains the image of the object, and calculates and outputs a movement value V(K).

The shutter control circuit 12 receives the 1-bit digital signal sig_sh for shutter control, counts the number of high-level signals, compares the counted number with a previously set maximum count value and minimum count value of high-level signals, and outputs the shutter control signal CSH adjusting a shutter-on time.

Operation of the optical pointing system according to the second exemplary embodiment of the present invention will be described with reference to FIGS. 5 and 7.

Assuming that the image sensor 10 consists of a 18×18 pixel array, that is, 324 pixels, when the number of 1-bit digital signals sig_sh for shutter control having the high level because the voltage of the output signal PC12 of the photocell located in the corresponding pixel 112 is higher than the reference voltage Vref is two hundred or more, the quantity of incident light may be considered too large, and the maximum count value may be, for example, two hundred. On the other hand, when the number of 1-bit digital signals sig_sh for shutter control having the high level is one hundred or less, the quantity of incident light may be considered too small, and the minimum count value may be, for example, one hundred.

When the reference voltage generation unit 14 receives the power supply voltage VDD from the outside and generates the reference voltage Vref, the pixels 111 to 1NN of the image sensor 10 produce a two-dimensional image of an object under the control of the reset signal RS and the shutter control signal CSH, and the photocells included in the respective pixels 111 to 1NN perform an initialization operation in response to the reset signal RS and then generate analog signals having a voltage proportional to the quantity of incident light.

The generated analog signal PC12 is provided to the comparator 1122 of the corresponding pixel 112 and the comparator 1132 of the adjacent pixel 113, and the comparator 1122 compares the output signal PC12 of the photocell 1121 located in the pixel 112 with the output signal PC13 of the photocell 1121 located in the adjacent pixel 113 or the reference voltage Vref in response to the shutter control signal CHS.

In other words, when the shutter control signal CHS is the low level, the output signal PC12 of the photocell 1121 located in the pixel 112 is compared with the output signal PC13 of the photocell 1121 located in the adjacent pixel 113. When the output signal PC12 of the photocell 1121 located in the pixel 112 has a higher voltage than the output signal PC13 of the photocell 1121 located in the adjacent pixel 113, the 1-bit digital signal sig_m for movement calculation having the high level is generated and output. On the other hand, when the output signal PC12 of the photocell 1121 located in the pixel 112 has a lower voltage than the output signal PC13 of the photocell 1121 located in the adjacent pixel 113, the 1-bit digital signal sig_m for movement calculation having the low level is generated and output.

When the shutter control signal CHS is the high level, the output signal PC12 of the photocell 1121 located in the pixel 112 is compared with the reference voltage Vref. Here, when the output signal PC12 of the photocell 1121 located in the pixel 112 has a higher voltage than the reference voltage Vref, the 1-bit digital signal sig_sh for shutter control having the high level is generated and output. On the other hand, when the output signal PC12 of the photocell 1121 located in the pixel 112 has a lower voltage than the reference voltage Vref, the 1-bit digital signal sig_sh for shutter control having the high level is generated and output.

The demultiplexer 16 receives the 1-bit digital signal sig_m for movement calculation and the 1-bit digital signal sig_sh for shutter control. Then, the demultiplexer 16 selects and outputs the 1-bit digital signal sig_m for movement calculation when the shutter control period selection signal SCS is the low level, and selects and outputs the 1-bit digital signal sig_sh for shutter control when the shutter control period selection signal SCS is the high level.

The image processor 11 receives $N^2$ number of 1-bit digital signals sig_m for movement calculation from the demultiplexer 16 and obtains an image of the object using the 1-bit digital signals sig_m for movement calculation. And, the image processor 11 compares the obtained image of the object with a previously obtained image of the object and calculates and outputs a movement value V(K).

The shutter control circuit 12 receives the 1-bit digital signal sig_sh for shutter control from the demultiplexer 16, counts high-level signals, compares the counted number with the previously set maximum count value and minimum count value of high-level signals, and outputs the shutter control signal CSH adjusting a shutter-on time.

More specifically, when the number of 1-bit digital signals sig_sh for shutter control output from the demultiplexer 16 is the previously set maximum count value of high-level signals, that is, 200 or more, the shutter control signal CSH reducing the shutter-on time is output. On the other hand, when the number of 1-bit digital signals sig_sh for shutter control is less than the previously set maximum count value of high-level signals, that is, 200, it is compared with the previously set minimum count value of high-level signals, that is, 100.

When the number of 1-bit digital signals sig_sh for shutter control is the minimum count value of 100 or less, the shutter control signal CSH increasing the shutter-on time is output. However, when the number of 1-bit digital signals sig_sh for shutter control is greater than the minimum count value of 100, the shutter-on time is maintained.

Figure 8:
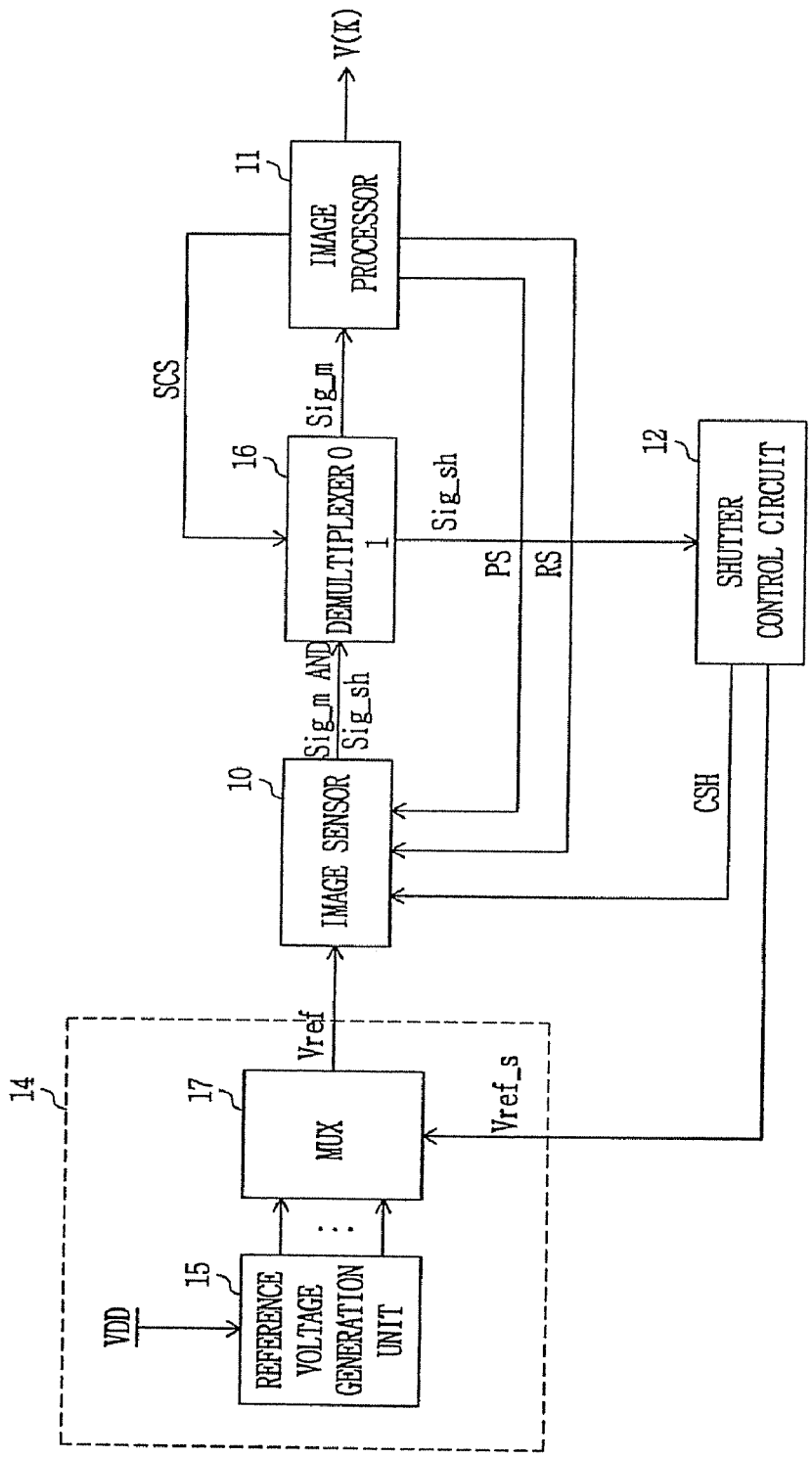
FIG. 8 is a block diagram of an overall optical pointing system including an improved reference voltage generation unit according to the second exemplary embodiment of the present invention.

FIG. 8 illustrates an overall block diagram of the optical pointing system including the improved reference voltage generation unit 14 according to the second exemplary embodiment of the present invention. The optical pointing system includes the reference voltage generation unit 14, the image sensor 10, the demultiplexer 16, the image processor 11 and the shutter control circuit 12, and the reference voltage generation unit 14 includes a reference voltage generator 15 and a multiplexer 17.

Functions and operation of the blocks except for the reference voltage generation unit 14 included in the optical pointing system shown in FIG. 8 are the same as those of the blocks included in the optical pointing system according to the second exemplary embodiment of the present invention shown in FIGS. 5 to 7, and thus will not be described again.

A difference between the two optical pointing systems is in that the reference voltage Vref generated by the reference voltage generation unit 14 can adaptively vary according to a count value obtained in a time period in which a shutter control frame is selected. Thus, the reference voltage Vref can be generated at a plurality of voltage levels including the maximum reference voltage and the minimum reference voltage, and then selected and used.

More specifically, when the number of high-level 1-bit digital signals sig_sh for shutter control output from the demultiplexer 16 is the previously set maximum count value of high-level signals, that is, 200 or more, the reference voltage Vref is increased or reduced. And, when the number of high-level 1-bit digital signals sig_sh for shutter control is less than the maximum count value of 200, it is compared with the previously set minimum count value of high-level signals, that is, 100.

When the number of high-level 1-bit digital signals sig_sh for shutter control is the minimum count value of 100 or less, the reference voltage Vref is increased or reduced. However, when the number of high-level 1-bit digital signals sig_sh for shutter control is greater than the minimum count value of 100, the reference voltage Vref is maintained.

To this end, the reference voltage generation unit 14 may include the reference voltage generator 15, which receives a power supply voltage VDD from the outside and generates a plurality of reference voltages, and the multiplexer 17, which selects one of the reference voltages in response to a reference voltage selection signal from the shutter control circuit 12 and applies the selected reference voltage to the image sensor 10.

In the optical pointing system according to the second exemplary embodiment of the present invention, a comparator in a unit pixel operates in a latch type as a comparator in a unit pixel according to the first exemplary embodiment of the present invention, thereby providing the same effects as an A/D converter having a considerable level of resolution. In addition, a comparator in a unit pixel alternatively compares the output signal PC12 of the photocell 1121 located in the corresponding pixel 112 with the output signal PC13 of the photocell 1121 located in the adjacent pixel 113 or the reference voltage Vref in response to the shutter control signal CHS, thereby controlling the shutter-on time. Furthermore, it is possible to use the reference voltage Vref adaptively varying according to the count value of high-level 1-bit digital signals sig_sh for shutter control in a time period in which a shutter control frame is selected, and thus the shutter-on time can be varied.

Figure 9:
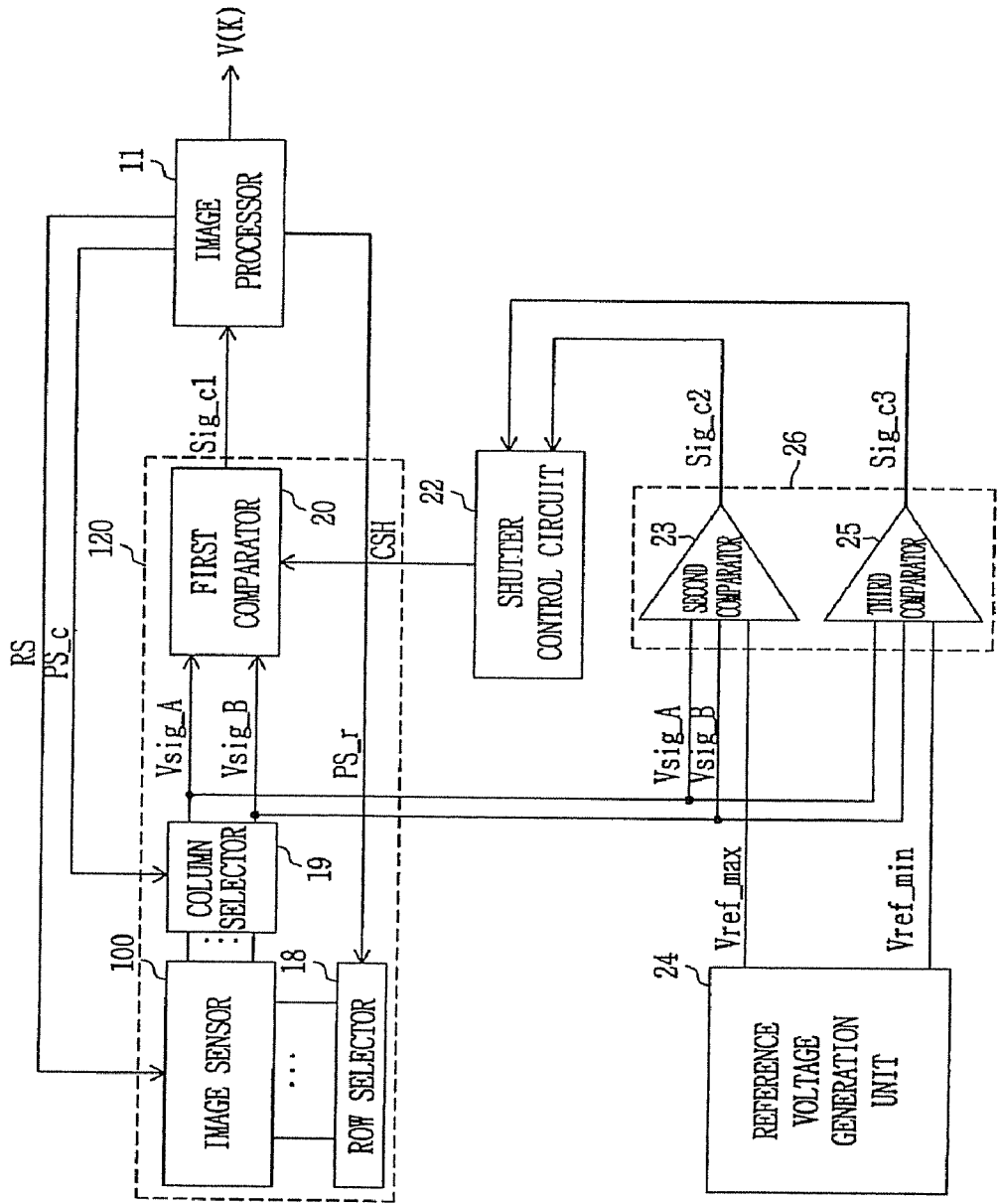
FIG. 9 is a block diagram of an overall optical pointing system with an image sensor according to a third exemplary embodiment of the present invention.

FIG. 9 is a block diagram of an overall optical pointing system with an image sensor 100 according to a third exemplary embodiment of the present invention. The optical pointing system includes the image sensor 100, a row selector 18, a column selector 19, a reference voltage generation unit 24, first to third comparators 20, 23 and 25, an image processor 11 and a shutter control circuit 22.

Figure 10:
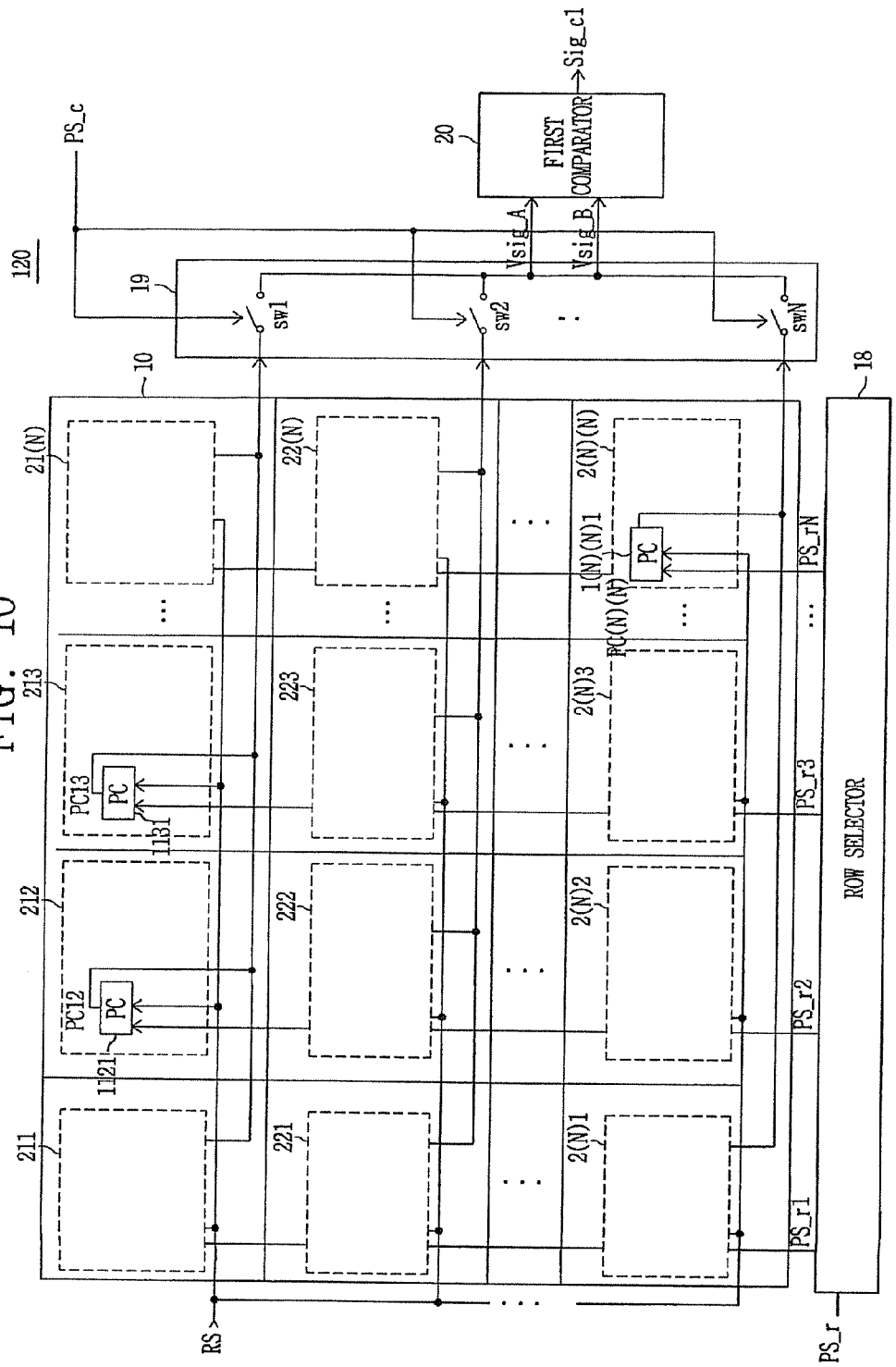
FIG. 10 is a detailed block diagram of an image sensor, a row selector, a column selector and a first comparator in an optical pointing system according to the third exemplary embodiment of the present invention.

FIG. 10 illustrates a detailed block diagram of the image sensor 100, the row selector 18, the column selector 19 and the first comparator 20 in the optical pointing system according to the third exemplary embodiment of the present invention. The column selector 19 includes a plurality of column-specific switches SW1 to SWN.

Referring to FIG. 9, the image sensor 100 includes a plurality of pixels 211 to 2NN constituting an N×N pixel array. Each pixel, for example, the pixel 212 is configured of a photocell 1121 alone unlike the pixels 111 to 1NN of the image sensor 10 according to the first exemplary embodiment of the present invention shown in FIG. 2, and has the comparator 1122 and the switch 1123 of FIG. 2 on its outside.

Here, the image processor 11 and the shutter control circuit 22 may be combined as a movement calculation and shutter control unit, the first to third comparators 20, 23 and 25 may be combined as one comparison unit, or all the blocks may be integrated in one semiconductor chip.

Functions of the optical pointing system according to the third exemplary embodiment of the present invention will be described below with reference to FIGS. 9 and 10.

The pixels 211 to 2NN of the image sensor 100 produce a two-dimensional image of an object under the control of a reset signal RS and a shutter control signal CSH, and the photocells included in the respective pixels 211 to 2NN perform an initialization operation in response to the reset signal RS and then generate analog signals having a voltage proportional to the quantity of incident light.

The row selector 18 outputs a plurality of row selection signals PS_r1 to PS_rN selecting pixels in the vertical direction by designating a row address of the pixels 211 to 2NN in the image sensor 100.

The column-specific switches SW1 to SWN in the column selector 19 switch in response to a pixel column selection signal PS_c and designate pixels in the horizontal direction so that one pixel is selected at the row address designated by the row selector 18. After selecting the pixel, the column selector 19 receives and transfers voltage signals proportional to the quantity of light from the pixel.

The reference voltage generation unit 24 receives a power supply voltage VDD from the outside and generates a maximum reference voltage Vref_max and a minimum reference voltage Vref_min to be compared with voltage signals output from the respective pixels 211 to 2NN.

The first comparator 20 receives voltage signals of the selected pixels transferred from the column selector 19, compares voltages in response to the shutter control signal CSH, and generates and outputs a first comparison digital signal Sig_c1 having a high level or a low level.

The second and third comparators 23 and 25 receive one of the voltage signals of the selected pixels from the column selector 19, and the maximum reference voltage Vref_max and the minimum reference voltage Vref_min from the reference voltage generation unit 24, compare voltages, and generate and output second and third comparison digital signals Sig_c2 and Sig_c3 having a high level or a low level.

The image processor 11 generates the reset signal RS for initializing a pixel and a pixel selection signal PS and provides the reset signal RS and the pixel selection signal PS to the image sensor 100. In addition, the image processor 11 receives $N^2$ number of first comparison digital signals Sig_c1 output from the first comparator 20, obtains an image of the object using the first comparison digital signals Sig_c1, compares the obtained image of the object with a previously obtained image of the object, and calculates and outputs a movement value V(K).

The shutter control circuit 12 compares the count value of high-level signals output from the second and third comparators 23 and 25 with a previously set maximum count value and minimum count value of high-level signals, and outputs and provides the shutter control signal CSH adjusting a shutter-on time to the first comparator 20.

Operation of the optical pointing system according to the third exemplary embodiment of the present invention will be described below with reference to FIGS. 9 and 10.

Assuming that the image sensor 100 consists of a 18×18 pixel array, that is, 324 pixels, as in the second exemplary embodiment, when the number of 1-bit digital signals having the high level is two hundred or more because the voltage of an output signal PC12 of the photocell 1121 located in the corresponding pixel 212 is higher than the voltage of an output signal PC13 of a photocell 1131 located in one selected pixel 213 on the upper, lower, left or right side of the pixel 212, the quantity of incident light may be considered too large, and the maximum count value may be, for example, two hundred. On the other hand, when the number of 1-bit digital signals having the high level is one hundred or less, the quantity of incident light may be considered too small, and the minimum count value may be, for example, one hundred.

The pixels 211 to 2NN of the image sensor receive the reset signal RS and the shutter control signal CSH from the image processor 11, and produce a two-dimensional image of an object in response to the signals.

For example, the photocell 1121 included in one pixel 212 among the pixels 211 to 2NN performs an initialization operation in response to the reset signal RS, and generates the analog signal PC12 having a voltage proportional to the quantity of incident light when the initialization operation is completed.

The row selector 18 and the column selector 19 designate in sequence pixels having a row address and a column address corresponding to a selection time set by the image processor 11 and a pixel to be selected, and receive analog image data output from the photocell of each pixel by reading the pixels one by one.

For example, when the image processor 11 designates the first row address PS_r1, image data is received by designating the first column address to an N-th column address. After this, when the image processor 11 designates the second row address PS_r2, image data is received by again designating the first column address to the N-th column address. In this way, all pixel data is received, thereby obtaining image data of one frame.

Here, the row selector 18 outputs the row selection signals PS_r1 to PS_rN selecting pixels in the vertical direction by designating a row address of the pixels 211 to 2NN in the image sensor 100, and the respective column-specific switches SW1 to SWN of the column selector 19 switch in response to the pixel column selection signal PS_c from the image processor 11 to designate pixels in the horizontal direction.

Thus, one pixel located at a crossing point along a row address designated by the row selection signals PS_r1 to PS_rN output from the row selector 18 is selected, and voltage signals proportional to the quantity of light are output from the selected pixel.

The first comparator 20 receives voltage signals Vsig_A and Vsig_B of selected pixels from the column selector 19 and compares voltages in response to the shutter control signal CSH of the shutter control circuit 22. The first comparator 20 generates and outputs the first comparison digital signal Sig_c1 having the high level when the output signal PC12 of the photocell 1121 located in the corresponding pixel 212 has a higher voltage than the output signal PC13 of the photocell 1131 located in one selected pixel 213 on the upper, lower, left or right side of the pixel 212, and the first comparison digital signal Sig_c1 having the low level when the output signal PC12 of the photocell 1121 has a lower voltage than the output signal PC13 of the photocell 1131.

Meanwhile, when the reference voltage generation unit 24 receives the power supply voltage VDD from the outside and generates the maximum and minimum reference voltages Vref_max and Vref_min, the second comparator 23 receives one of the voltage signals Vsig_A and Vsig_B of the selected pixels from the column selector 19 and the maximum reference voltage Vref_max from the reference voltage generation unit 24 and compares voltages. The second comparator 23 generates and outputs the second comparison digital signal Sig_c2 having the high level when the output signal PC12 of the photocell 1121 located in the corresponding pixel 212 has a higher voltage than the maximum reference voltage Vref_max, and the second comparison digital signal Sig_c2 having the low level when the output signal PC12 of the photocell 1121 has a lower voltage than the maximum reference voltage Vref_max.

The third comparator 25 receives one of the voltage signals Vsig_A and Vsig_B of the selected pixels from the column selector 19 and the minimum reference voltage Vref_min from the reference voltage generation unit 24 and compares voltages. The third comparator 25 generates and outputs the third comparison digital signal Sig_c3 having the high level when the output signal PC12 of the photocell 1121 located in the corresponding pixel 212 has a higher voltage than the minimum reference voltage Vref_min, and the third comparison digital signal Sig_c3 having the low level when the output signal PC12 of the photocell 1121 has a lower voltage than the minimum reference voltage Vref_min.

The image processor 11 receives $N^2$ number of the first comparison digital signals Sig_c1 from the first comparator 20 and obtains an image of the object using the first comparison digital signals Sig_c1. And, the image processor 11 compares the obtained image of the object with a previously obtained image of the object and calculates and outputs a movement value V(K).

The shutter control circuit 22 receives the second comparison digital signal Sig_c2 from the second comparator 23 and the third comparison digital signal Sig_c3 from the third comparator 25, counts the number of second comparison digital signals Sig_c2 having the high level and the number of third comparison digital signals Sig_c3 having the high level, compares the numbers with the previously set maximum and minimum count values of high-level signals, and outputs the shutter control signal CSH adjusting a shutter-on time.

More specifically, when the number of high-level second comparison digital signals Sig_c2 generated by the second comparator 23 is the previously set maximum count value of high-level signals, that is, 200 or more, the shutter control signal CSH reducing the shutter-on time is output. On the other hand, when the number of high-level second comparison digital signals Sig_c2 is less than the previously set maximum count value of 200, the number of high-level third comparison digital signals Sig_c3 generated by the third comparator 25 is compared with the previously set minimum count value of high-level signals, that is, 100.

When the number of high-level third comparison digital signals Sig_c3 is the minimum count value of 100 or less, the shutter control signal CSH increasing the shutter-on time is output. However, when the number of high-level third comparison digital signals Sig_c3 is greater than the minimum count value of 100, the shutter-on time is maintained.

In the optical pointing system according to the third exemplary embodiment of the present invention, the comparators 20, 23 and 25 operate in a latch type as a comparator in a unit pixel according to the first exemplary embodiment of the present invention, thereby providing the same effects as an A/D converter having a considerable level of resolution. In addition, with each pixel in the image sensor 100 configured of a photocell alone, the voltage of the output signal PC12 of the photocell 1121 located in the corresponding pixel 212 is compared with that of the output signal PC13 of the photocell 1131 located in one selected pixel 213 on the upper, lower, left or right side of the pixel 212. Thus, the shutter-on time can be varied.

Figure 11:
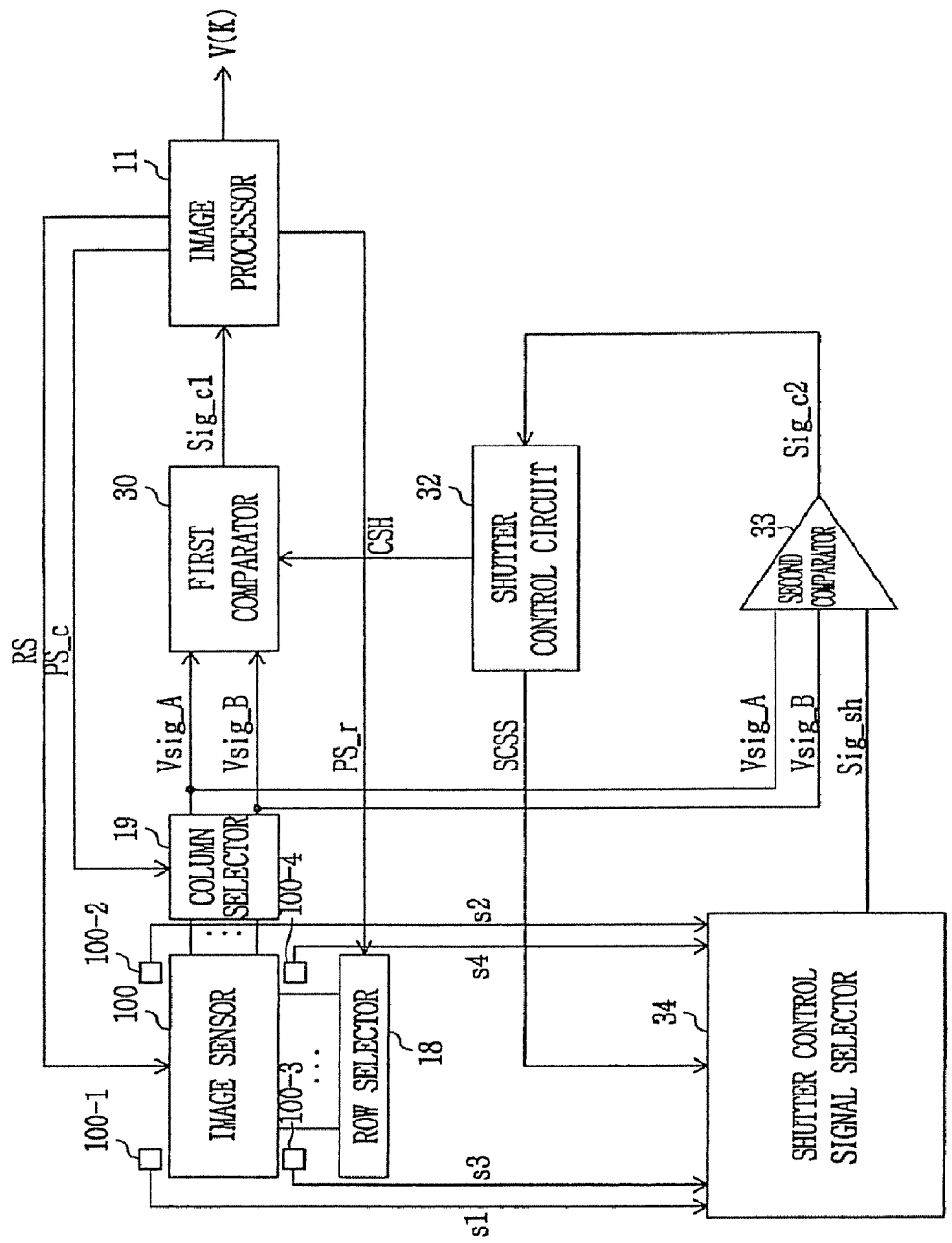
FIG. 11 is a block diagram of an overall optical pointing system with an image sensor according to a fourth exemplary embodiment of the present invention.

FIG. 11 is a block diagram of an overall optical pointing system with an image sensor 100 according to a fourth exemplary embodiment of the present invention. The optical pointing system includes the image sensor 100, a row selector 18, a column selector 19, a plurality of pixels 100-1 to 100-4 for shutter control, a signal selector 34 for shutter control, first and second comparators 30 and 33, an image processor 11, and a shutter control circuit 32.

Figure 12:
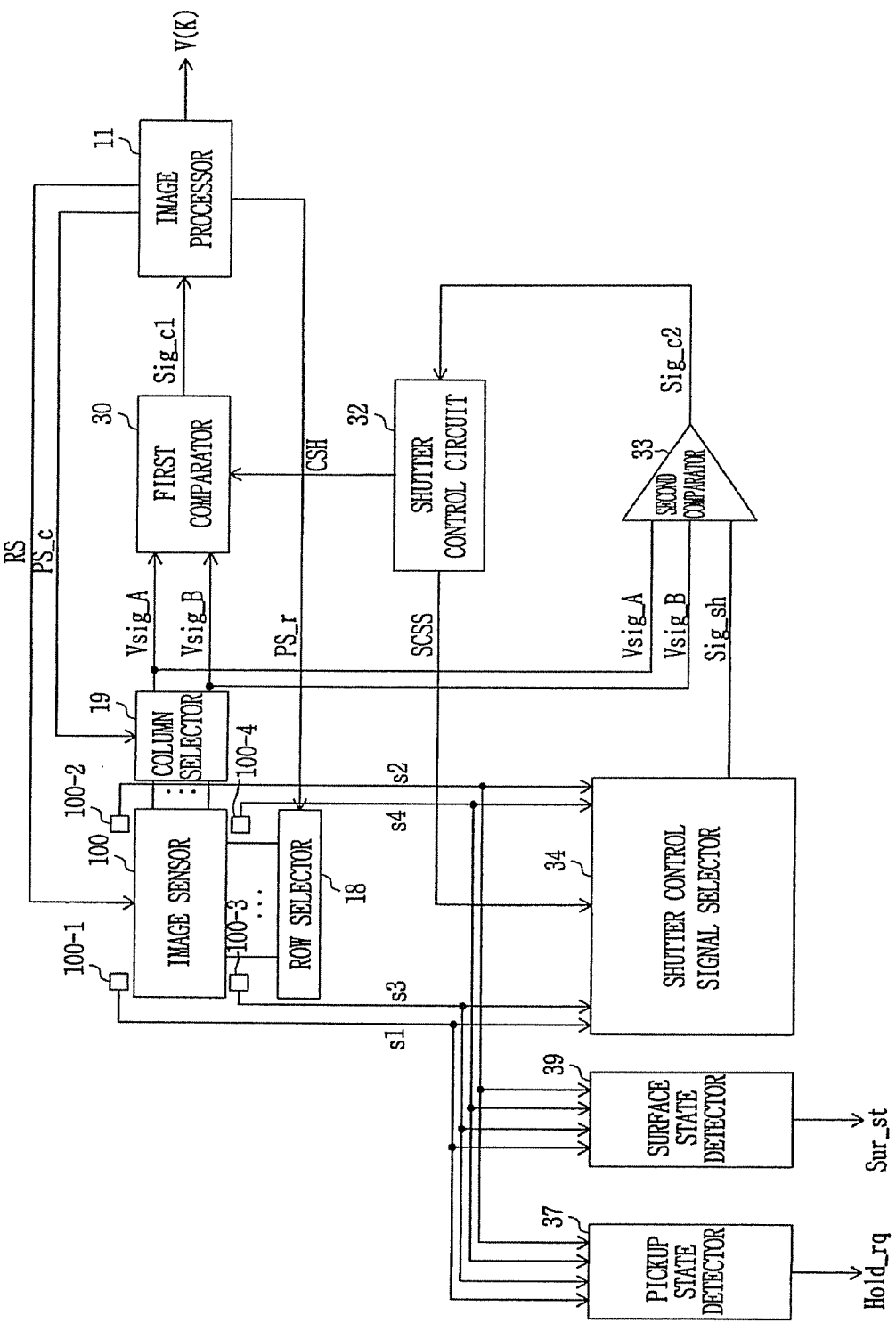
FIG. 12 illustrates an overall block diagram of another optical pointing system with an image sensor according to the fourth exemplary embodiment of the present invention.

FIG. 12 illustrates an overall block diagram of another optical pointing system with an image sensor according to the fourth exemplary embodiment of the present invention. The optical pointing system includes a voltage level comparator 36, a pickup state detector 37, and a surface state detector 39 in addition to the constitution of the optical pointing system according to the fourth exemplary embodiment of the present invention shown in FIG. 11.

As in the optical pointing system according to the third exemplary embodiment of the present invention shown in FIG. 9, the image sensor 100 according to the fourth exemplary embodiment of the present invention includes a plurality of pixels 211 to 2NN constituting an N×N pixel array, and each pixel, for example, the pixel 212 is configured of a photocell 1121 alone and has a comparator 1122 and a switch 1123 on its outside. The optical pointing systems according to the fourth exemplary embodiment of the present invention are different from the optical pointing system shown in FIG. 9 in that they have the pixels 100-1 to 100-4 for shutter control and the signal selector 34 for shutter control instead of the reference voltage generation unit 24.

Likewise, the image processor 11 and the shutter control circuit 32 may be combined as a movement calculation and shutter control unit, the first and second comparators 30 and 33 may be combined as one comparison unit, or all the blocks may be integrated in one semiconductor chip.

Functions of the blocks of the optical pointing system according to the fourth exemplary embodiment of the present invention will be described below with reference to FIGS. 11 and 12.

Functions of the image sensor 100, the row selector 18, the column selector 19, the first comparator 30, and the image processor 11 are the same as those of the optical pointing system according to the third exemplary embodiment of the present invention shown in FIG. 9 and thus will not be described again.

Like the pixels 211 to 2NN of the image sensor 100, the pixels 100-1 to 100-4 for shutter control perform an initialization operation in response to a reset signal RS of the image processor 11, produce a two-dimensional image of an object, and generate analog signals having a voltage proportional to the quantity of incident light. However, the pixels 100-1 to 100-4 are different from the pixels 211 to 2NN in that they are intended not for movement value calculation but for shutter control.

The signal selector 34 for shutter control receives a plurality of signals S1 to S4 for shutter control from the pixels 100-1 to 100-4 for shutter control, and selects and outputs at least one signal Sig_sh for shutter control in response to a signal selection signal SCSS for shutter control from the shutter control circuit 32.

The second comparator 33 receives one of voltage signals Vsig_A and Vsig_B of selected pixels from the column selector 19 and the selected signal Sig_sh for shutter control from the signal selector 34 for shutter control, compares voltages, and generates and outputs a second comparison digital signal Sig_c2 for shutter control having the high or low level.

The shutter control circuit 32 compares a count value of high-level signals output from the second comparator 33 with the previously set maximum and minimum count values of high-level signals, and outputs and provides a shutter control signal CSH adjusting a shutter-on time to the first comparator 30.

As illustrated in FIG. 11, the pixels 100-1 to 100-4 for shutter control may be disposed at parts of the outside of the pixel array, around the outside of the pixel array, or at parts of the inside of the pixel array.

In addition, as illustrated in FIG. 12, the optical pointing system according to the fourth exemplary embodiment of the present invention may additionally include the pickup state detector 37 which is connected with the signal selector 34 for shutter control in parallel, receives the signals S1 to S4 for shutter control from the pixels 100-1 to 100-4 for shutter control, compares outputs, determines whether or not the optical pointing system is picked up, and outputs a hold request signal Hold_req, and the surface state detector 39 which outputs a surface information signal Sur_st indicating a state of a worktable according to difference between the signals S1 to S4 for shutter control.

Operation of the optical pointing system according to the fourth exemplary embodiment of the present invention will be described below with reference to FIGS. 11 and 12.

The image sensor 100, the row selector 18, the column selector 19, the first comparator 30, and the image processor 11 operate in the same way as those of the optical pointing system according to the fourth exemplary embodiment of the present invention shown in FIG. 6, and thus will not be described again Assuming that the image sensor 100 consists of a 18×18 pixel array, that is, 324 pixels as in the second and third exemplary embodiments, when the number of second comparison digital signals Sig_c2 for shutter control having the high level because the voltage of an output signal PC12 of the photocell 1121 located in the corresponding pixel 212 is greater than the voltage of one selected signal Sig_sh for shutter control is two hundred or more, the quantity of incident light may be considered too large, and the maximum count value may be, for example, two hundred. On the other hand, when the number of second comparison digital signals Sig_c2 for shutter control having the high level is one hundred or less, the quantity of incident light may be considered too small, and the minimum count value may be, for example, one hundred.

When the pixels 100-1 to 100-4 for shutter control obtains a two-dimensional image of an object and generate an analog signal for shutter control proportional to the quantity of incident light after performing an initialization operation in response to the reset signal RS of the image processor 11, the signal selector 34 for shutter control receives the signals S1 to S4 for shutter control from the pixels 100-1 to 100-4 for shutter control, and selects and outputs at least one signal Sig_sh for shutter control in response to the signal selection signal SCSS for shutter control from the shutter control circuit 32.

The second comparator 33 receives one of the voltage signals Vsig_A and Vsig_B of selected pixels from the column selector 19 and the selected signal Sig_sh for shutter control from the signal selector 34 for shutter control, and compares voltages. The second comparator 33 generates and outputs the second comparison digital signal Sig_c2 for shutter control having the high level when the output signal PC12 of the photocell 1121 located in the corresponding pixel 212 has a higher voltage than the selected signal Sig_sh for shutter control, and the second comparison digital signal Sig_c2 for shutter control having the low level when the output signal PC12 of the photocell 1121 has a lower voltage than the selected signal Sig_sh for shutter control.

When the number of high-level second comparison digital signals Sig_c2 generated by the second comparator 33 is the previously set maximum count value of high-level signals, that is, 200 or more, the shutter control circuit 32 outputs the shutter control signal CSH reducing the shutter-on time. On the other hand, when the number of high-level second comparison digital signals Sig_c2 is less than the maximum count value of 200, the shutter control circuit 32 compares the number of high-level second comparison digital signals with the previously set minimum count value of high levels, that is, 100.

The shutter control circuit 32 outputs the shutter control signal CSH increasing the shutter-on time when the number of high-level second comparison digital signals is the minimum count value of 100 or less, and maintains the shutter-on time when the number of high-level second comparison digital signals is greater than the minimum count value of 100.

Meanwhile, as illustrated in FIG. 12, the optical pointing system according to the fourth exemplary embodiment of the present invention may additionally include the pickup state detector 37 which is connected with the signal selector 34 for shutter control in parallel, receives the signals S1 to S4 for shutter control from the pixels 100-1 to 100-4 for shutter control, compares voltages to analyze difference in voltage, determines whether or not the optical pointing system is picked up, and outputs the hold request signal Hold_req, and the surface state detector 39 which outputs the surface information signal Sur_st indicating a state of a worktable surface according to difference in voltage between the signals S1 to S4 for shutter control to an external host computer.

In the optical pointing system according to the fourth exemplary embodiment of the present invention, the first comparator 30 operates in a latch type as a comparator in a unit pixel according to the first exemplary embodiment of the present invention, thereby providing the same effects as an A/D converter having a considerable level of resolution. In addition, with each pixel in the image sensor 100 configured of a photocell alone, the voltage of the output signal PC12 of the photocell 1121 located in the corresponding pixel 212 and the voltage of the output signal PC13 of the photocell 1131 located in one selected pixel 213 on the upper, lower, left or right side of the pixel 212 are compared with the voltages of the signals S1 to S4 for shutter control output from the pixels 100-1 to 100-4 for shutter control other than a reference voltage. Thus, the shutter-on time can be varied.

As described above, according to the inventive image sensor and the optical pointing system using the same, the image sensor performs functions of digital conversion and pre-filtering through the comparator of each pixel, and thus it is possible to output 1-bit digital signals. Thus, an A/D converter and the pre-filter having high resolution are not required, and it is possible to decrease a layout area.

In addition, with each pixel in the image sensor configured of a photocell alone, the voltages of output signals of a photocell located in the corresponding pixel and a photocell located in a pixel on the upper, lower, left or right side of the corresponding pixel are compared with a reference voltage or the voltages of signals for shutter control. Thus, a shutter-on time can be varied.

While exemplary embodiments of the present invention have been specifically described, but those skilled in the art will understand that various modifications, additions and substitutions are possible without departing from the scope and the spirit of the invention as defined in the appended claims.

What is claimed is:

1. An image sensor having a plurality of pixels, each pixel comprising:
   a photocell for receiving light and generating an analog signal having a voltage corresponding to a quantity of the received light;
   a comparator for comparing the analog signal of the photocell with an analog signal of an adjacent pixel to output a digital signal for movement calculation or comparing the analog signal of the photocell with a reference value to output a digital signal for shutter control;
   a switch for transferring the digital signal for movement calculation and the digital signal for shutter control in response to a pixel selection signal;
   a signal selector for receiving the digital signal for movement calculation and the digital signal for shutter control, and selecting and outputting one of the digital signal for movement calculation and the digital signal for shutter control in response to a shutter control period selection signal; and
   a movement calculation and shutter control unit for receiving the digital signal for movement calculation to obtain an image of an object and output a movement value of the optical pointing system and the shutter control period selection signal, and receiving the digital signal for shutter control to compare a high-level count value with a maximum count value and a minimum count value and output the shutter control signal.

2. The image sensor of claim 1, wherein the photocell has a photodiode generating a photocurrent corresponding to the quantity of the received light.

3. The image sensor of claim 2, wherein the comparator is a latch type comparator outputting a first signal when the analog signal of the photocell is greater than the analog signal of the adjacent pixel or the reference signal, and outputting a second signal when the analog signal of the photocell is less than the analog signal of the adjacent pixel or the reference signal.

4. The image sensor of claim 3, wherein the first signal is the digital signal for movement calculation and the digital signal for shutter control having a high voltage, and the second signal is the digital signal for movement calculation and the digital signal for shutter control having a low voltage.

5. An optical pointing system, comprising:
   a reference voltage generation unit for generating a reference voltage;
   an image sensor having a plurality of pixels, receiving light, generating a plurality of analog signals corresponding to a quantity of the received light, and, in response to a shutter control signal, comparing analog signals of adjacent pixels to generate a digital signal for movement calculation or comparing the analog signals with the reference voltage to generate a digital signal for shutter control;
   a signal selector for receiving the digital signal for movement calculation and the digital signal for shutter control, and selecting and outputting one of the digital signal for movement calculation and the digital signal for shutter control in response to a shutter control period selection signal;
   a movement calculation and shutter control unit for receiving the digital signal for movement calculation to obtain an image of an object and output a movement value of the optical pointing system and the shutter control period selection signal, and receiving the digital signal for shutter control to compare a high-level count value with a maximum count value and a minimum count value and output the shutter control signal.

6. The optical pointing system of claim 5, wherein the movement calculation and shutter control unit includes:
   an image processor for generating a reset signal and a pixel selection signal, and receiving the digital signal for movement calculation to obtain the image of the object and output the movement value of the optical pointing system and the shutter control period selection signal; and
   a shutter control circuit for receiving the digital signal for shutter control to set the high-level maximum count value and minimum count value in advance, and comparing the number of high-level digital signals for shutter control with the maximum count value and the minimum count value to output the shutter control signal.

7. The optical pointing system of claim 6, wherein each pixel of the image sensor includes:
   a photocell for receiving the light and generating an analog signal having a voltage corresponding to the quantity of the received light;
   a comparator for, in response to the shutter control signal, comparing the analog signals of adjacent pixels to generate the digital signal for movement calculation, or comparing the analog signals of the pixels with the reference voltage to generate the digital signal for shutter control; and
   a switch for receiving the digital signal for movement calculation and the digital signal for shutter control and switching to transfer the digital signal for movement calculation and the digital signal for shutter control in response to the pixel selection signal.

8. The optical pointing system of claim 7, wherein the image processor generates and outputs the reset signal initializing the pixels, the pixel selection signal selecting at least one of the pixels, and the shutter control period selection signal selecting a shutter control frame time period for comparing an output signal of the selected pixel with the reference voltage to the image sensor, receives the digital signal for movement calculation to obtain the image of the object using the digital signal, and compares the image of the object with a previously obtained image of the object to calculate and output the movement value of the optical pointing system.

9. The optical pointing system of claim 8, wherein the shutter control circuit outputs the shutter control signal reducing a shutter-on time when the number of high-level digital signals for shutter control is the maximum count value or more, compares the number of high-level digital signals for shutter control with the minimum count value when the number of high-level digital signals for shutter control is less than the maximum count value, outputs the shutter control signal increasing the shutter-on time when the number of high-level digital signals for shutter control is the minimum count value or less, and outputs the shutter control signal maintaining the shutter-on time when the number of high-level digital signals for shutter control is greater than the minimum count value.

10. The optical pointing system of claim 9, wherein the shutter control circuit sets up the maximum count value and the minimum count value of the high-level digital signals for shutter control in advance, and compares the number of high-level digital signals for shutter control with the maximum count value and the minimum count value to output a reference voltage selection signal.

11. The optical pointing system of claim 10, wherein the reference voltage generation unit includes:

a reference voltage generator for receiving a power supply voltage from outside and generating a plurality of reference voltages; and a multiplexer for receiving and selecting one of the reference voltages in response to the reference voltage selection signal.

12. The optical pointing system of claim 11, wherein the shutter control circuit outputs the reference voltage selection signal selecting a low reference voltage from among the reference voltages when the number of high-level digital signals for shutter control is the maximum count value or more, compares the number of high-level digital signals for shutter control with the minimum count value when the number of high-level digital signals for shutter control is less than the maximum count value, outputs the reference voltage selection signal selecting a high reference voltage from among the reference voltages when the number of high-level digital signals is the minimum count value or less, and outputs the reference voltage selection signal maintaining the reference voltage when the number of high-level digital signals is greater than the minimum count value.

* * * * *